United States Patent [19]

Martel

[11] Patent Number: 4,872,082

[45] Date of Patent: Oct. 3, 1989

[54] DOOR OPERATOR SAFETY FEATURE REQUIRING CONSTANT ACTUATION TO CLOSE DOOR

[75] Inventor: Brian J. Martel, Walled Lake, Mich.

[73] Assignee: Stanley Electronics, Novi, Mich.

[21] Appl. No.: 177,703

[22] Filed: Apr. 5, 1988

Related U.S. Application Data

[63] Continuation-in-part of Ser. No. 92,107, Sep. 2, 1987, abandoned.

[51] Int. Cl.[4] .............................................. H02P 1/00

[52] U.S. Cl. .................................... 361/179; 307/326; 307/119; 318/265; 318/266; 318/282

[58] Field of Search .................... 361/1, 179; 307/326, 307/119, 112, 328; 318/280–283, 264–266, 466

[56] References Cited

U.S. PATENT DOCUMENTS

| | | | |
|---|---|---|---|
| 3,539,894 | 11/1970 | Feldman | 318/463 |
| 3,754,176 | 8/1973 | Miller | 318/266 |
| 4,045,715 | 8/1977 | Umplehy et al. | 318/16 |
| 4,092,575 | 5/1978 | Ogishi et al. | 318/282 |
| 4,142,137 | 2/1979 | Umplehy et al. | 318/283 |
| 4,146,826 | 3/1979 | Wojslawowicz | 318/297 |
| 4,357,564 | 11/1982 | Deming et al. | 318/280 |
| 4,386,398 | 5/1983 | Matsuoka et al. | 364/167 |
| 4,404,558 | 9/1983 | Yen | 340/825.72 |
| 4,408,146 | 10/1983 | Beckeman | 318/264 |
| 4,455,517 | 6/1984 | Mitchell | 318/283 |
| 4,467,249 | 8/1984 | Swearington | 318/282 |
| 4,475,069 | 10/1984 | Tadokoro et al. | 318/265 |

*Primary Examiner*—Todd E. DeBoer
*Attorney, Agent, or Firm*—Krass & Young

[57] ABSTRACT

The present invention is a safety feature in an automatic garage door operator. In the prior art a single momentary contact push button, either directly connected to the automatic garage door operator or connected via a radio transmitter, is used to control door operation. In accordance with the present invention, closing the garage door requires continuous actuation of the momentary contact push button from the time the operation is begun until the door is fully closed. Any interruption in this continuous operation causes the automatic garage door operator to reverse and fully open the door. Thus continuous attention of the operator is required, thus enhancing safety because of the attention of the operator.

12 Claims, 1 Drawing Sheet

DOOR OPERATOR SAFETY FEATURE REQUIRING CONSTANT ACTUATION TO CLOSE DOOR

This is a continuation of application Ser. No. 07/92,107, filed 9/2/87 which is now abandoned.

FIELD OF THE INVENTION

The field of the present invention is that of safety features on automatic door operators such as electric garage door operator.

BACKGROUND OF THE INVENTION

Electric garage door openers are well known in the art. A typical electric garage door operator requires a single button for control. This single button may be either a momentary contact push-button which is hard wired to the electric garage door opener or it may be a single button on a radio frequency transmitter which transmits a signal to a radio frequency receiver in the electric garage door opener. The electric garage door operator remembers the last prior direction of operation and operates in the opposite direction upon further actuation of the single button. A typical sequence for successive actuation of the single push-button is: move in the closing direction; stop; move in the opening direction; and stop. Each actuation of the single push-button advances the operation to the next state in the sequence. This sequence repeats once it is completed. Therefore, the single button can be employed to control the opening and closing of a garage door.

The provision of electrical operators for garage doors introduces a unique safety hazard not present in manually operated doors. Electrical garage door operators do not have the discretion that a person would have to stop or alter the operation if an obstruction or hazardous condition is encountered. Instead, these electric garage door operators continue to operate unless stopped by some means built into them. One common safety hazard of electrical garage door operators is the actuation of the door for closing while inside the garage followed by an attempt to exit the garage by walking under the closing door. The person may slip and fall and be struck by the closing door. This scenario is common among small children, who may make a game of attempting to beat the door.

Typical electrical garage door operators include one or more safety systems to reduce the safety hazard. One such means is a safety strip disposed on the leading edge of the garage door. If this safety strip encounters any obstruction a switch is closed which alters the garage door opener to cause it to stop or reverse operation. Also typical of the safety features employed in such electric garage door operators are sensors that sense the mechanical tension on the drive train of the door operator. According to the prior art a cam device is connected to the drive train and pivots against a spring loaded cam follower, the cam follower mechanically coupled to a switch. If the mechanical tension on the drive train exceeds a predetermined amount then a switch is closed. The motor controller for the electric garage door operator senses the closing of the switch and initiates a safety operation. In accordance with the current state of the art, if the door were closing the motor controller would cause the garage door operator to stop, reverse direction of operation and return to the fully open position once this obstruction switch is closed. On the other hand, upon the closing of this switch when the door is opening the motor controller would merely stop the garage door. This difference in the safety operation between opening and closing of the garage door is because the opening operation of the garage door is believed safer than the closing operation. Another typical obstruction sensing device employs a light beam directed across the garage door opening. If this light beam is broken by an object the obstruction sensing device generates a signal to stop or reverse the garage door operation. Such light beam obstruction sensing devices require accurate positioning and aiming of the light source to enable proper operation and to provide the safety desired.

All of these safety features leave something to be desired as it is still possible for the operation to be hazardous even with these safety features. It would be desirable to require some attention by the operator throughout the whole action of the electric garage door operator, particularly when the door is being closed so that the operator can detect an unsafe condition.

SUMMARY OF THE INVENTION

It is an object of the present invention to provide a safety feature in an automatic door operator. In accordance with the present invention the door may be closed only by continuous actuation of the single push-button for the entire period from the beginning of the closing operation until the door is completely closed. This feature requires the operator's attention throughout the closing operation, thereby enabling the operator's attention to be directed to the door during this entire period. As a consequence, the operator is more likely to detect and respond to an unsafe condition than in accordance with the prior art.

A further feature of the present invention is that the operator constant contact push-button is required only for closing the door. Opening the door can be actuated as known in the prior art through a single momentary depression of the push-button. The operator is also able to more quickly respond to an unsafe condition when this technique is employed. The door operation can be rendered safe by merely releasing the operator push button rather than requiring some positive action from the operator as required by the prior art.

In accordance with a further feature of the present application, this safety feature may be enabled or disabled through the actuation of a toggle or slide switch in the automatic door operator. Thus in some installations this safety feature may be disabled, while in other situations it may be enabled.

BRIEF DESCRIPTION OF THE FIGURE

These and other objects of the present invention will become clear from the following description of the invention taken together with FIG. 1 which illustrates the circuits in accordance with the preferred embodiment of the present invention.

DETAILED DESCRIPTION OF THE PREFERRED EMBODIMENT

Figure 1:
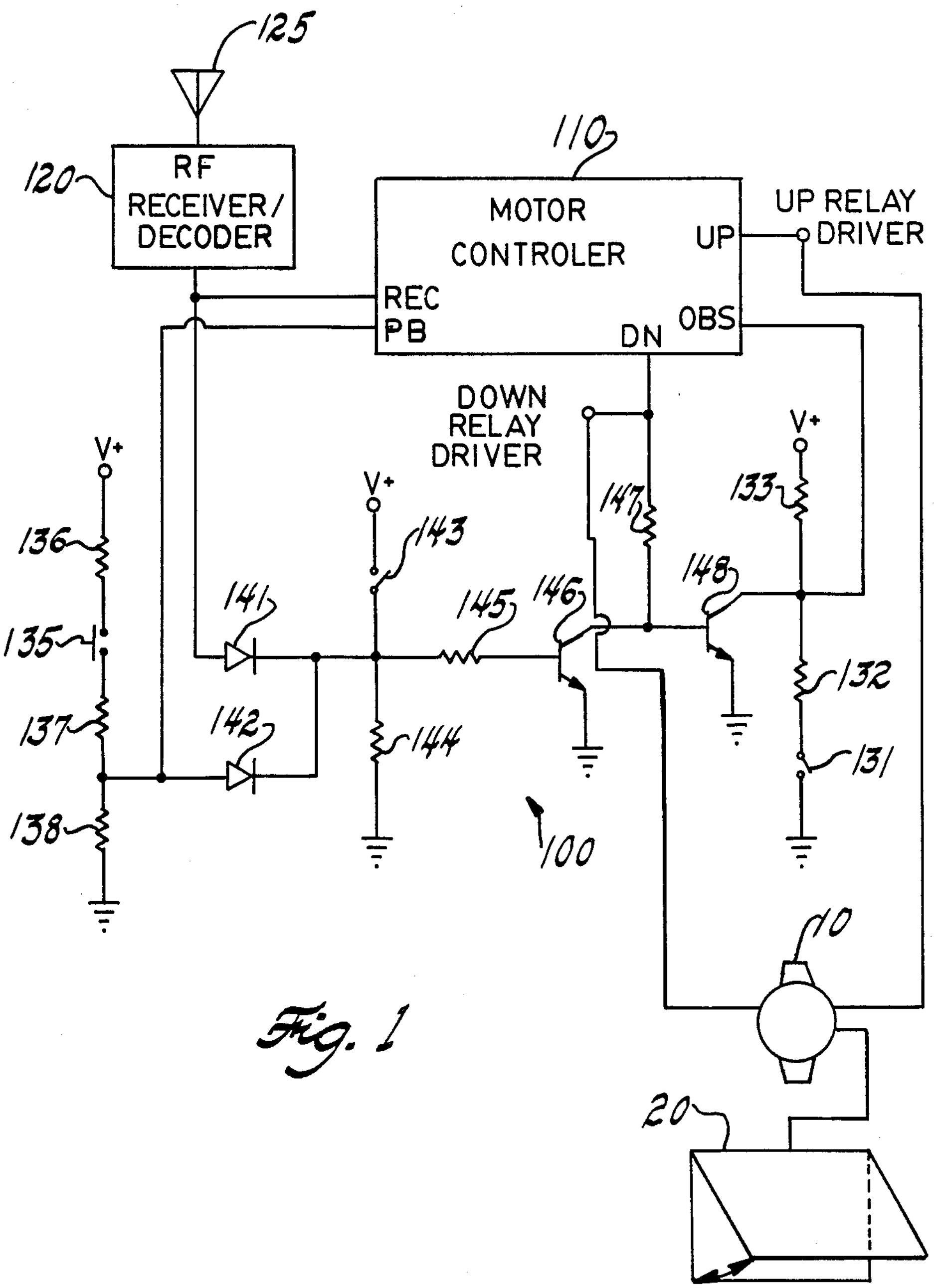

FIG. 1 of the present application illustrates circuit 100 for embodying the present invention. Circuit 100 includes motor controller 110 which is constructed in accordance with the prior art for control of the motor of the electric garage door operator. Motor controller 110 includes an input for receiving an operation signal from RF receiver/decoder 120, an input from push-button 135, and an input from obstruction switch 131. Motor controller 110 generates a down signal which is applied to a down relay driver and an up signal which is applied to an up relay driver. The down relay driver, in accordance with the prior art, actuates the motor of the electric garage door operator to lower the garage door. The up relay driver, in accordance with the prior art, actuates the electric motor to raise the garage door. Motor controller 110 may also include other inputs for indicating when the door is fully open or fully closed for deactuation of the electric motor. These features are in accordance with the prior art and will not be further described herein.

In accordance with the prior art, circuit 100 is actuated by either push-button switch 135 or by an RF transmitter having a similar push-button switch via radio frequency receiver/decoder 120. Radio frequency receiver/decoder 120 is attached to antenna 125 which receives the radio signal. Radio frequency receiver/decoder 120 generates an output signal indicative of when the proper electric garage door operation signal is received via antenna 125. This is applied to a receive input of motor controller 110. In addition, this signal is applied to the circuits in accordance with the present invention in a manner that will be more fully disclosed below.

The electric garage door operator includes momentary contact push-button switch 135, which is typically mounted in the garage near to the door to the rest of the house. This momentary contact push-button switch 135 is included in a voltage divider circuit including resistors 136, 137 and 138. Actuation of momentary contact push-button switch 135 applies a predetermined voltage at the junction between resistors 137 and 138. This signal is applied to a push-button input of motor controller 110 and also applied to the circuits of the present invention in a manner which will be more fully described below.

Circuit 100 includes an obstruction switch 131 constructed in accordance with the prior art. Obstruction switch 131 is normally open. In this state pull-up resistor 133 provides a logical high signal to the obstruction input of motor controller 110. Motor controller 110, in accordance with the prior art, recognizes this state as the normal operation state and therefore any normal operation of motor controller 110 in controlling the motor to raise or lower the garage door is permitted. When the tension on the drive train exceeds a predetermined amount, obstruction switch 131 is closed. This causes current to flow through a voltage divider including resistor 133 and resistor 132. In this case, the voltage applied to the obstruction input of motor controller 110 is a logical low. Motor controller 110, in accordance with the prior art, recognizes this as an abnormal operation signal and therefore the control of the motor for driving the garage door is interrupted and a safety function is executed. This safety function is preferably differs depending on whether the garage door was opening or closing when the obstruction switch was tripped. Thus if the door is being closed, tripping of the obstruction switch would cause the door to reverse and completely open. On the other hand, if the door was being opened, tripping of the obstruction switch causes the door to stop.

The circuit of the present invention illustrated in FIG. 1 employs this obstruction input to the motor controller 110 during its operation. The circuit illustrated in FIG. 1 trips this obstruction input, in the same way as obstruction switch 131, if the push-button is not continuously actuated during closing of the door.

The circuit of the present invention receives inputs from both the push-button switch 135 and from the radio frequency receiver/decoder 120. The actuation signal from radio frequency receiver/decoder 120, indicating the depression of the single push-button switch on the radio frequency transmitter (not illustrated) is applied to the circuit of the present invention via diode 141. Similarly, the signal generated by push-button switch 135 is connected to the present circuit via diode 142. These diodes are connected together to a circuit which biases the input of transistor 146. This connection via diodes is known as a wired OR circuit. Ignoring for the moment switch 143, the base bias of transistor 146 is applied via resistor 145. If either push-button 135 is actuated, or radio frequency receiver 120 generates a receive signal indicating reception of the appropriate radio frequency signal from its associated transmitter, transistor 146 is biased on. This causes any current flowing through resistor 147 to pass through the collector/emitter path of transistor 146 rather than to the base of transistor 148. Accordingly, transistor 148 is turned off. In this state, no current flows through transistor 148 and therefore transistor 148 does not effect the voltage applied to the obstruction input of motor controller 110. However, if neither push-button 135 is actuated nor the push-button on the transmitter transmitting to RF receiver/decoder 120 is actuated then transistor 146 is biased off. In such a state, the voltage at the down output of motor controller 110 causes a current to flow into the base of transistor 148 via resistor 147.

If motor controller 110 selects an up operation then this down output is near zero and transistor 148 is still biased off. In such a state transistor 148 does not effect the obstruction input to motor controller 110. If, however, motor controller 110 is controlling a down operation, a substantial voltage appears at the down output of motor controller 110. This voltage causes the base of transistor 148 to be biased to turn on via resistor 147. Accordingly, transistor 148 is turned on and causes the obstruction input to motor controller 110 to be near ground. Motor controller 110 then actuates the safety function in the same manner as if obstruction switch 131 had been tripped.

Note that if motor controller 110 is not generating the down signal then transistor 148 cannot be biased on and therefore will never turn on. Thus the safety signal is generated only during the time in which motor controller 110 powers the down relay driver. Therefore the safety feature of the present invention occurs only when the garage door is closing and not when it is opening.

Enable switch 143 cooperates with resistor 144 to enable or disable the safety function of the present invention. When enable switch 143 is open the circuits of the present invention operate as described above. When enable switch 143 is closed then a current flows into the base of transistor 146 via resistor 145 to bias transistor 146 on. Therefore transistor 146 always biases transistor 148 off. In such a state, the safety feature invention is disabled because transistor 148 never turns on to generate the low signal to the obstruction input of motor controller 110. On the other hand, with enable switch 143 open, the safety feature of the present invention is enabled. The operation of obstruction switch is not changed by enable switch 143.

I claim:

1. A door operator safety circuit comprising:

a motor operable to move a door between an open position and a closed position;

a momentary contact push button switch generating an operator command when activated;

a motor controller connected to said motor and said momentary contact push button switch controlling said motor upon each receipt of said operator command from said momentary contact push button switch to advance to the next state in the circular sequence of states including (1) move the door in the closing direction, (2) stop, (3) move door in the opening direction, and (4) stop, said motor controller further having a safety mode controlling the motor to move the door to a safe position when triggered;

a safety switch coupled to the door and connected to said motor controller triggering said safety mode of said motor controller upon detection of an unsafe condition of the door; and a safety circuit connected to said momentary contact push button switch and said motor controller triggering said safety mode unless said momentary contact push button switch continuously generates said operator command during movement of the door.

2. The door operator safety circuit as claimed in claim 1, wherein:

said safety mode of said motor controller reverses motion of the door by reversing said motor when triggered.

3. The door operator safety circuit as claimed in claim 1, wherein:

said safety mode of said motor controller reverses the motion of the door by reversing said motor if triggered when the door is closing, and stops the motion of the door by stopping said motor if triggered when the door is opening.

4. The door operator safety circuit as claimed in claim 6, wherein:

said motor controller generates a down signal when controlling said motor to move the door in the closing direction; and said safety circuit is responsive to said down signal whereby said safety mode is triggered in the absence of continuous activation of said momentary contact push button switch when said motor controller is controlling said motor to move the door in the closing direction, thereby requiring continuous activation of said momentary contact push button switch for closing the door, and said safety mode is not triggered in the absence of continuous activation of said momentary contact push button switch when said motor controller is controlling said motor to move the door in the opening direction, thereby permitting opening of the door upon momentary activation of said momentary contact push button switch.

5. The door operator safety circuit as claimed in claim 1, wherein:

said safety circuit further includes an enable/disable switch having an enable position and a disable position, whereby said safety mode is triggered unless said momentary contact push button switch is continuously activated during movement of the door when said enable/disable switch is in said enable position, thereby requiring continuous activation of said momentary contact push button switch for moving the door when said enable/disable switch is in said enable position, and said safety mode is not triggered in the absence of continuous activation of said momentary contact push button switch during movement of the door when said enable/disable switch is in said disable position, thereby permitting opening or closing of the door upon momentary activation of said momentary contact push button switch when said enable/disable switch is in said disable position.

6. The door operator safety circuit as claimed in claim 1, further comprising:

a radio frequency receiver/decoder connected to said motor controller and said safety circuit, said radio frequency receiver/decoder receiving radio frequency signals and generating a second operator command applied to said motor controller and said safety circuit upon reception of a properly encoded radio frequency signal; and wherein said motor controller further controlling said motor upon each receipt of said second operator command from said radio frequency receiver/decoder to advance to the next state in the circular sequence of states including (1) move the door in the closing direction, (2) stop, (3) move door in the opening direction, and (4) stop; and said safety circuit further triggering said safety mode unless either said momentary contact push button switch generates said operator command or said radio frequency receiver/decoder generates said second operator command continuously during movement of the door.

7. The door operator safety circuit as claimed in claim 1, wherein:

said safety switch consists of a normally open switch connected to the door, said safety switch is closed when the tension driving the door exceeds a predetermined amount; and said safety circuit includes a semiconductor switching device connected in parallel to said safety switch which is normally biased nonconductive and which is biased conductive for triggering said safety mode.

8. In an automatic door operator including a door, a motor operable to move the door between an open position and a closed position, a safety circuit, a momentary contact push button switch generating an operator command when activated, a motor controller controlling the motor upon each receipt of the operator command from the momentary contact push button switch to advance to the next state in the circular sequence of states including (1) move the door in the closing direction, (2) stop, (3) move door in the opening direction, and (4) stop, the motor controller further having a safety mode controlling the motor to move the door to a safe position when triggered, and a normally open safety switch coupled to the door which is closed when the tension driving the door exceeds a predetermined amount for triggering the safety mode of the motor controller, the safety circuit comprising:

a semiconductor switching device connected in parallel to said safety switch;

a logic circuit connected to the momentary contact push button switch and said semiconductor switching device normally biasing said semiconductor switching device nonconductive and biasing said semiconductor switching device conductive for triggering said safety mode unless the momentary contact push button switch continuously generates the operator command during movement of the door.

9. The automatic door operator as claimed in claim 8, wherein the motor controller further generates a down signal when controlling the motor to move in the closing direction, said safety circuit wherein;

said logic circuit is further responsive to the down signal whereby said semiconductor switching device is biased conductive for triggering said safety mode in the absence of continuous activation of said momentary contact push button switch when the down signal is received indicating the motor controller is controlling the motor to move the door in the closing direction, thereby requiring continuous activation of said momentary contact push button switch for closing the door, and said semiconductor switching device is not biased conductive for triggering said safety mode in the absence of continuous activation of said momentary contact push button switch when said motor controller is controlling said motor to move the door in the opening direction, thereby permitting opening of the door upon momentary activation of said momentary contact push button switch.

10. The automatic door operator as claimed in claim 8, said safety circuit further comprising:

an enable/disable switch having an enable position and a disable position; and wherein said logic circuit is further connected to said enable/-disable switch whereby said semiconductor switching device is biased conductive for triggering said safety mode unless said momentary contact push button switch is continuously activated during movement of the door when said enable/disable switch is in said enable position, thereby requiring continuous activation of said momentary contact push button switch for moving the door when said enable/disable switch is in said enable position, and said semiconductor switching device is not biased conductive for triggering said safety mode in the absence of continuous activation of said momentary contact push button switch during movement of the door when said enable/disable switch is in said disable position, thereby permitting opening and closing of the door upon momentary activation of the momentary contact push button switch when said enable/disable switch is in said disable position.

11. A door operator safety circuit comprising:

a motor operable to move a door between an open position and a closed position;

a momentary contact push button switch generating an operator command when activated;

a normally open safety switch connected to the door, said safety switch closed when the tension driving the door exceeds a predetermined amount;

a motor controller connected to said motor, said momentary contact push button switch and said safety switch controlling said motor upon each receipt of said operator command from said momentary contact push button switch to advance to the next state in the circular sequence of states including (1) move the door in the closing direction, (2) stop, (3) move door in the opening direction, and (4) stop, said motor controller generating a down signal when controlling said motor to move the door in the closing direction, and said motor controller further having a safety mode controlling the motor to move the door to a safe position when said safety switch is closed;

a safety circuit connected to said momentary contact push button switch and said motor controller, said safety circuit including a semiconductor switching device connected in parallel to said safety switch, an enable/disable switch having an enable position and a disable position, and a logic circuit connected to the momentary contact push button switch, said semiconductor switching device and said enable/disable switch, said logic circuit normally biasing said semiconductor switching device nonconductive and biasing said semiconductor switching device conductive for triggering said safety mode unless the momentary contact push button switch continuously generates the operator command during movement of the door only when both said down signal is received and said enable/disable switch is in said enable position, thereby permitting opening of the door upon momentary activation of said momentary contact push button switch and permitting opening and closing of the door upon momentary activation of said momentary contact push button switch when said enable/disable switch is in said disable position.

12. The door operator safety circuit as claimed in claim 11, further comprising:

a radio frequency receiver/decoder connected to said motor controller and said safety circuit and receiving radio frequency signals and generating a second operator command for application to said motor controller and said safety circuit upon reception of a properly encoded radio frequency signal; and wherein said motor controller further controlling said motor upon each receipt of said second operator command from said radio frequency receiver/decoder to advance to the next state in the circular sequence of states including (1) move the door in the closing direction, (2) stop, (3) move door in the opening direction, and (4) stop; and said logic circuit is further connected to said radio frequency receiver/decoder biasing said semiconductor switching device conductive for triggering said safety mode unless either said momentary contact push button switch generates the operator command or said radio frequency receiver/decoder generates said second operator command continuously during movement of the door only when both said down signal is received and said enable/disable switch is in said enable position.

* * * * *

UNITED STATES PATENT AND TRADEMARK OFFICE

CERTIFICATE OF CORRECTION

PATENT NO. : 4,872,082

DATED : Oct. 3, 1989

INVENTOR(S) : Martel

It is certified that error appears in the above-identified patent and that said Letters Patent is hereby corrected as shown below:

Column 5, line 39, "claim 6" should be --claim 1--.

Signed and Sealed this

Thirtieth Day of October, 1990

*Attest:*

HARRY F. MANBECK, JR.

*Attesting Officer* *Commissioner of Patents and Trademarks*